(12) United States Patent
Mark et al.

(10) Patent No.: US 11,649,038 B2
(45) Date of Patent: May 16, 2023

(54) HYBRID ELECTRIC POWERPLANT (HEP) CONTROL ARCHITECTURE

(71) Applicant: Pratt & Whitney Canada Corp., Longueuil (CA)

(72) Inventors: Michael Mark, Montreal (CA); Leonid Guerchkovitch, Dollard des Ormeaux (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 487 days.

(21) Appl. No.: 16/926,009

(22) Filed: Jul. 10, 2020

(65) Prior Publication Data

US 2022/0009615 A1 Jan. 13, 2022

(51) Int. Cl.
| | | |
|---|---|---|
| B64D 27/24 | (2006.01) | |
| B64D 27/02 | (2006.01) | |
| B64C 11/30 | (2006.01) | |
| B60L 3/00 | (2019.01) | |
| F02C 9/58 | (2006.01) | |
| F02C 9/42 | (2006.01) | |
| B60L 3/04 | (2006.01) | |
| B60L 50/16 | (2019.01) | |
| B64D 31/06 | (2006.01) | |

(52) U.S. Cl.
CPC .......... B64C 11/305 (2013.01); B60L 3/0023 (2013.01); B60L 3/0061 (2013.01); B60L 3/04 (2013.01); B60L 50/16 (2019.02); B64C 11/303 (2013.01); B64D 27/24 (2013.01); B64D 31/06 (2013.01); F02C 9/42 (2013.01); F02C 9/58 (2013.01); *B64D 2027/026* (2013.01)

(58) Field of Classification Search
None
See application file for complete search history.

(56) References Cited

U.S. PATENT DOCUMENTS 4,040,250 A * 8/1977 Saunders .................. F02C 9/28
60/39.281
4,686,825 A * 8/1987 Cavasa ..................... F02C 9/00
60/243

(Continued)

FOREIGN PATENT DOCUMENTS

| EP | 3613674 A1 | 2/2020 |
|---|---|---|
| WO | WO-2020180367 A1 | 9/2020 |

OTHER PUBLICATIONS

Extended European Search Report for European Patent Application No. EP21184554.0, dated Nov. 25, 2021.

*Primary Examiner* — Jason H Duger
(74) *Attorney, Agent, or Firm* — Norton Rose Fulbright Canada LLP

(57) ABSTRACT

A system includes a thermal engine operatively connected to drive a propeller. An electric motor is operatively connected to the thermal engine to drive the propeller together with the thermal engine. An external input system is configured to accept input and output a thrust command. A protection function module is configured to enforce limits on the thermal engine, electric motor, and propeller. A low select module is operatively connected to receive input from the external input system and form the protection function module and to output the lower of input from the protection function module and external input system to the thermal engine, the electric motor, and the propeller.

20 Claims, 2 Drawing Sheets

(56) References Cited

U.S. PATENT DOCUMENTS

| | | | |
|---|---|---|---|
| 2006/0283191 A1* | 12/2006 | Horswill | F02C 9/28 |
| | | | 60/773 |
| 2008/0177456 A1* | 7/2008 | Hill | F02C 9/26 |
| | | | 701/100 |
| 2015/0013306 A1* | 1/2015 | Shelley | F02K 5/00 |
| | | | 60/224 |
| 2018/0237125 A1* | 8/2018 | Lisio | B64C 11/30 |
| 2018/0346139 A1* | 12/2018 | Ferran | B64D 31/06 |
| 2018/0370646 A1* | 12/2018 | Hon | B64D 27/24 |

\* cited by examiner

HYBRID ELECTRIC POWERPLANT (HEP) CONTROL ARCHITECTURE

BACKGROUND

1. Field

The present disclosure relates to hybrid electric powerplant (HEP), and more particularly to control architectures for HEP for aircraft.

2. Description of Related Art

A control system of a hybrid electric powerplant (HEP) system is required to control thrust, which can include controlling the various sources of torque (e.g., an electric motor and a thermal engine) as well as the propeller if applicable. Protection measures are required, e.g., to provide a method of shutoff in case in of severe events such as overspeed, overtorque, and the like.

The conventional techniques have been considered satisfactory for their intended purpose. However, there is an ever present need for improved systems and methods for controlling hybrid electric propulsion. This disclosure provides a solution for this need.

SUMMARY

A system includes a thermal engine operatively connected to drive a propeller. An electric motor is operatively connected to the thermal engine to drive the propeller together with the thermal engine. An external input system is configured to accept input and output a thrust command. A protection function module is configured to enforce limits on the thermal engine, electric motor, and propeller. A low select module is operatively connected to receive input from the external input system and form the protection function module and to output the lower of input from the protection function module and external input system to the thermal engine, the electric motor, and the propeller.

The low select module can be configured to select a minimum torque/thrust command for the electric motor and the thermal engine based on inputs of a thermal engine controller and the protection function module, and to control the propeller to select a minimum thrust. A transmission can connect the thermal engine and the electric motor in parallel to drive the propeller. The propeller can be a variable pitch propeller, wherein the low select module connects to the propeller through a propeller controller connected to control blade pitch of the propeller. The low select module can connect to the electric motor through a motor controller connected to control speed and/or torque of the electric motor by controlling electrical power supplied to the electric motor. The low select module can connect to the thermal engine through a thermal engine controller connected to control thrust and/or speed of the thermal engine by controlling fuel flow to the thermal engine.

The protection function module can connect to the propeller through a feather module configured to feather blades of the propeller. The feather module can be connected to be controlled by the protection function module to trigger feathering of blades of the propeller in case of propeller or powerplant safety conditions such as overspeed. The protection function module can connect to the electric motor through a contactor/disconnect to cutoff power to the electric motor, or through a mechanical disconnect to cut off torque to the gearbox. The protection function module can connect to the thermal engine through a fuel metering valve (FMV) and/or a shutoff valve (SOV) to cutoff fuel flow to the thermal engine, and/or a disconnect to disconnect the thermal engine, e.g. from the gearbox. The protection function module can be configured to calculate torque command as limited by internal operating parameters including at least one of compressor inlet pressure/temperature, and remaining battery charge, and to monitor the electric motor, thermal engine and propeller for exceedance of key critical parameters including at least one of overthrust, overtorque, and overspeed, and to shut down an associated source among the electric motor, thermal engine, and propeller.

The external input system can include an avionics/FMS (flight mode select) input channel for receiving avionics/FMS input. The external input system can include a pilot input channel for receiving pilot input. The external input system can include a sensor input channel for receiving sensor input for feedback control of the thermal engine, electric motor, and/or propeller.

The external input system can include a mode select module configured to receive input from avionics/FMS (flight mode select), pilot input, and/or sensors, where the mode select module is configured to select a mode and output the mode to a thrust calculation module. The thrust calculation module can be configured to receive input from avionics/FMS, pilot input, and/or sensors, and to output steady state and transient thrust commands. The thrust calculation module can be configured to calculate a desired level of top level thrust based on mode selected, ambient conditions, and pilot input, and to calculate an acceleration/deceleration rate of command when a pilot moves a control lever and/or conditions change.

The mode select module can be configured to select from at least some of the following modes: a maximum thrust mode configured to be used when maximum possible thrust is needed for a given command, ambient conditions, and/or operating conditions; a quiet mode configured to optimize a noise level of the system by adjusting operating level of the thermal engine as well as blade angle and/or speed of the propeller; a fuel efficiency mode configured to reduce as much as possible fuel consumption of the thermal engine by compensating with the electric motor; an energy efficiency mode configured to reduce as much as possible electrical energy consumption of the electric motor by compensating with the thermal engine; and/or a regeneration mode configured to run at specific thermal engine condition in order to recharge onboard batteries.

A torque split and speed command module can be connected to receive steady state and transient thrust commands from the thrust calculation module and to output torque split and speed commands to the low select module. The torque split and speed and command module can be configured to split torque and speed commands between the electric motor and thermal engine and to manage the propeller for thrust.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
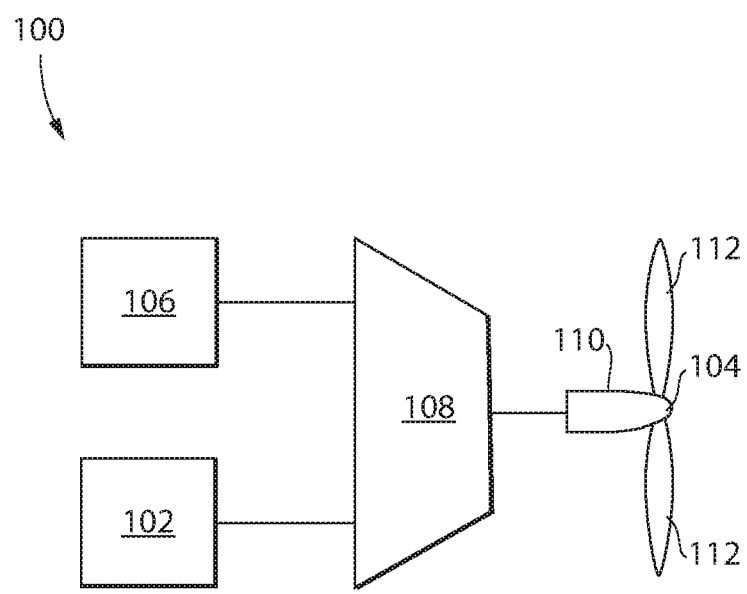
FIG. 1 is a schematic view of an embodiment of a hybrid electric powerplant (HEP) system for an aircraft constructed in accordance with the present disclosure, showing the parallel power lanes of the thermal engine and electric motor.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIG. 2, as will be described. The systems and methods described herein can be used to control hybrid electric powerplants (HEPs) including providing protection control for the various power lanes.

The system 100 includes a thermal engine 102 operatively connected to drive a propeller 104. An electric motor 106 is operatively connected to the thermal engine 102 to drive the propeller 104 together with the thermal engine 102. A transmission 108, e.g. including a combining gear box and/or reduction gear box, connects the thermal engine 102 and the electric motor 106 in parallel to drive the propeller 104. The propeller is a variable pitch propeller, wherein a variable pitch control 110 can rotate the blades 112 to various different pitch angles. A disconnect can be included between each torque source 102, 106 that can be located either in the transmission 108 or at the output of the individual torque source 102, 106.

Figure 2:
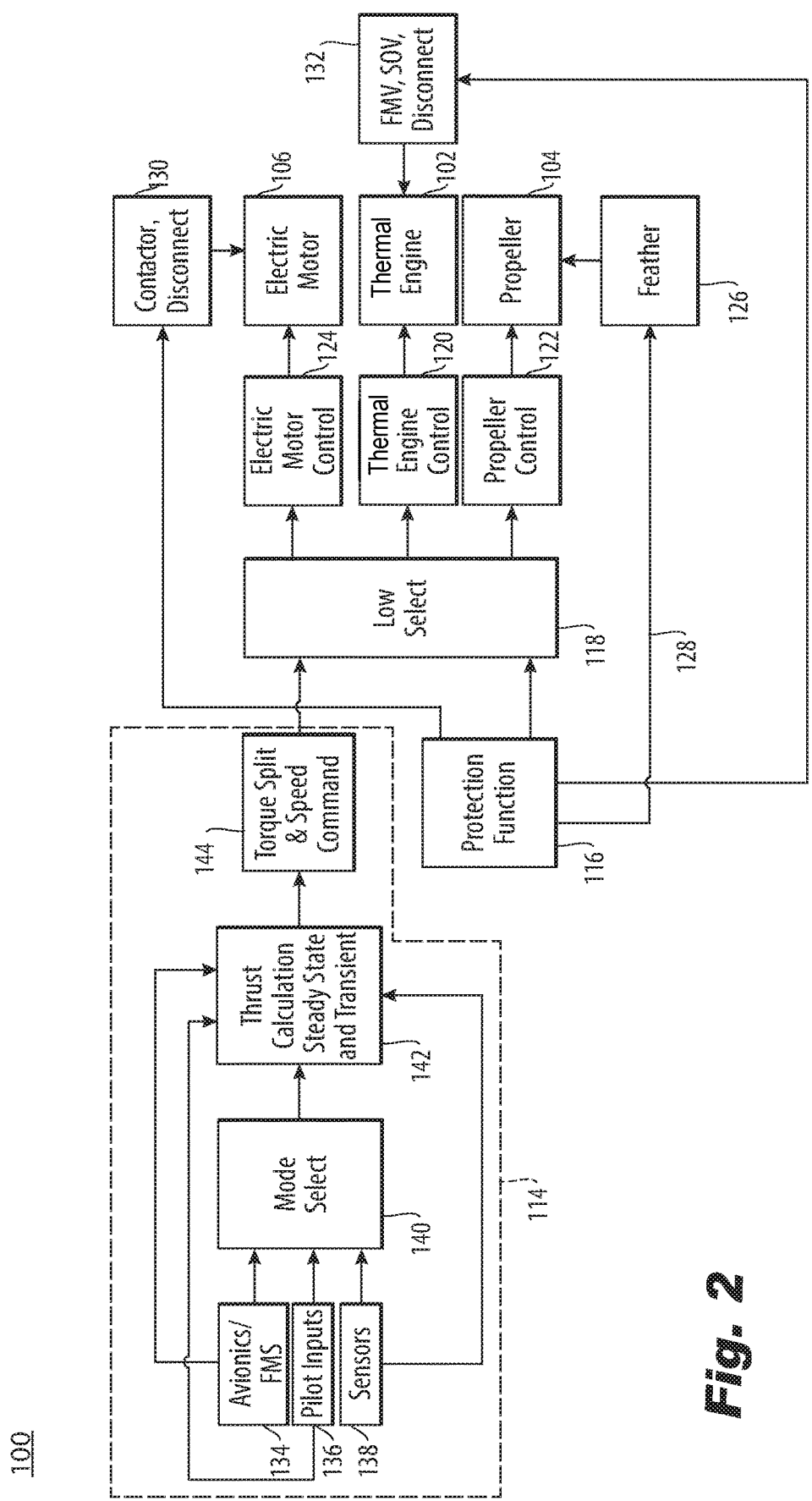
FIG. 2 is a schematic view of the system of FIG. 1, showing the control architecture.

With reference now to FIG. 2, an external input system 114 is configured to accept input and output a thrust command. A protection function module 116 is configured to enforce limits on the thermal engine 102, electric motor 106, and propeller 104. A low select module 118 is operatively connected to receive input from the external input system 114 and form the protection function module 116 and to output the lower of input from the protection function module 116 and external input system 114 to the thermal engine 102, the electric motor 106, and the propeller 104.

The low select module 118 is configured to select a minimum torque/thrust command from commands input from the external input system 114 and the protection function 116. It selects this minimum and outputs it a command input for the propeller 104, the electric motor 106, and the thermal engine 102 based on inputs of a thermal engine controller 120 and the protection function module 116. For example, the torque command to the thermal engine 102 could be limited based on a maximum temperature/pressure, which limit the protection function 116 and low select 118 enforce. Similarly, the propeller control 122 can be limited to the output of the low select module 118 for the blade position and speed. Similarly, the protection function 116 and low select module 118 can enforce limits on the electric motor control 124, which directly controls the electric motor 106. The low select module 118 connects to the propeller 104 through a propeller controller 122 connected to control blade pitch of the propeller 104, e.g. through the variable pitch control 110 (shown in FIG. 1).

The propeller controller 122 controls the blade angle and propeller speed for the propeller 104. The low select may also need to configure the blade angle to control the thrust output. The low select module 118 connects to the electric motor 106 through a motor controller 124 connected to control speed and/or torque of the electric motor 106 by controlling electrical power supplied to the electric motor 106. The motor controller 124 controls the motor current of the electric motor 106 to achieve a particular level of torque/speed. The low select module 118 connects to the thermal engine 102 through a thermal engine controller 120 connected to control thrust and/or speed of the thermal engine 102 by controlling fuel flow to the thermal engine 102. The thermal engine controller 120 controls the fuel flow and engine speed achieve a particular level of torque/speed for the thermal engine 102.

The protection function module 116 connects to the propeller 104 through a feather module 126 configured to feather blades 112 (shown in FIG. 1) of the propeller 104. The feather module 126 is connected to be controlled by the protection function module 116 (e.g., along line 128 in FIG. 2) to trigger feathering of blades 112 of the propeller 104 in case of propeller or powerplant safety conditions such as overspeed. The protection function module 116 connects to the electric motor 106 through a contactor 130 to cutoff power to the electric motor 106 and/or to mechanically disconnect the torque sources 102, 106 if needed. It is also contemplated that the protection function module 116 can connect to the electric motor through a mechanical disconnect to cut off torque to the gearbox. The contactor 130 provides a shutoff function for the electric motor 106 that is controlled by the independent protection function module 116, e.g. to trigger in case of extreme events (overspeed, overheat, etc). A disconnect can mechanically disconnect the torque sources 102, 106 from the transmission 108.

The protection function module 116 connects to the thermal engine 102 through a fuel metering valve (FMV) and/or a shutoff valve (SOV) to cutoff fuel flow to the thermal engine 102 if needed, and/or through a mechanical disconnect 132 to disconnect the thermal engine 102 from the gearbox. The FMV, SOV, disconnect 132 provides shutoff and mechanical disconnect functions for the thermal engine 102 that is controlled by the independent protection function module 116 to trigger in case of extreme events (overspeed, overtorque, etc). The protection function module 116 is configured to calculate a torque command as limited by internal operating parameters including at least one of compressor inlet pressure/temperature, and remaining battery charge, and to monitor the electric motor, thermal engine and propeller for exceedance of key critical parameters including at least one of overthrust, overtorque, and overspeed, and to shut down an associated source among the electric motor, thermal engine, and propeller, and disconnect the affected torque source 102, 106 as required.

With continued reference to FIG. 2, the external input system 114 includes an avionics/FMS (flight mode select) input channel 134 for receiving avionics/FMS input. The external input system 114 also includes a pilot input channel 136 for receiving pilot input. The external input system 114 also includes a sensor input channel 138 for receiving sensor input for feedback control of the thermal engine 102, electric motor 106, and/or propeller 104.

The external input system 114 includes a mode select module 140 configured to receive input from avionics/FMS (flight mode select), pilot input, and/or sensors e.g. through channels 134, 136, 138. The mode select module 140 is configured to select a mode and output the mode to a thrust calculation module 142. The mode select module 140 is configured to select from at least some of the following modes: a maximum thrust mode configured to be used when maximum possible thrust is needed for a given command, ambient conditions, and/or operating conditions; a quiet mode configured to optimize a noise level of the system by adjusting operating level of the thermal engine as well as blade angle and/or speed of the propeller; a fuel efficiency mode configured to reduce as much as possible fuel consumption of the thermal engine by compensating with the electric motor; an energy efficiency mode configured to reduce as much as possible electrical energy consumption of the electric motor by compensating with the thermal engine; and/or a regeneration mode configured to run at specific thermal engine condition in order to recharge onboard batteries.

The external input system 114 also includes a thrust calculation module 142. The thrust calculation module 142 is configured to receive input from avionics/FMS, pilot input, and/or sensors (e.g. from channels 134, 136, 138). The thrust calculation module 142 also receives the flight mode selected by the mode select module 140, The thrust calculation module 142 is configured to calculate a desired level of top level thrust based on mode selected, ambient conditions, and pilot input, and to calculate an acceleration/deceleration rate of command when a pilot moves a control lever and/or conditions change. The thrust calculation module 142 is configured to output steady state and transient thrust commands to the torque split and speed command module 144.

The torque split and speed command module 144 is connected to receive steady state and transient thrust commands from the thrust calculation module 142 and to output torque split and speed commands to the low select module 118. The torque split and speed and command module 144 is configured to split torque and speed commands between the electric motor 106 and thermal engine 102 for torque and to manage the propeller 104 to convert torque to thrust.

The control and protection functions for each torque source (e.g. electric motor 106, thermal engine 102) and the propeller 104 can be allocated to different controllers. The controller allocation may be consolidated, segregated, separated, and/or distributed to meet the various stakeholder needs such as safety, manufacturability, maintainability, and the like, in order to meet regulatory requirements, the control and protection may need to be functionally independent.

The independent protection function module 116 has at least two functions: a) Set the torque command to the electric motor/thermal engine 106, 102 as limited by internal parameters in response to a potential safety condition (component temperature, mechanical stress levels, and the like); and b) provide an independent method of shutoff in case of severe events (overtorque, overspeed, and the like). In the case of severe events, the independent protection function module 116 has the authority to independently shutoff the individual system components (thermal engine 102, electric motor 106, propeller 104) and take the torque source offline via a mechanical disconnect, electrical disconnect, or the like. The protection function can be in any controller box or separate controller boxes. The protection function specifies a limit for a given lane (the electric motor 106, thermal engine 102, and propeller 104), and the low select module 118 enforces the limits from the protection function to keep in range limits. The low select module 118 can allow safe intermediate modes, not just binary on/off.

The low select module 118 between the torque split and Speed Command module 144 and the protection function module, takes the lower of the two inputs and sends a command to the thermal engine 102, electric motor 106, and propeller 104. In normal operation, the lower of these inputs will be provided by the control function, i.e. the output from the external input system 114. In the event of a potential safety condition, the protection function module 116 will instead send a low torque command to reduce torque and/or speed.

Potential benefits of the invention include the following. The proposed architecture can allow for the pilot to control the HEP system with just one lever as opposed to the more common PLA (power level angle) and CLA (condition level angle) arrangement found in turboprops. The thrust/torque/propeller speed profile can be optimized for the phase of flight and overall operation of the aircraft. The independent protection function module 116 can provide protection against malfunctions to maintain safe operation of engine and aircraft. Limiting functions can be implemented within the control and protection functions reducing pilot workload. Controllers and protection can be segregated, consolidated, and distributed as needed. Protection functions can choose to limit or shutdown the torque source and maintain secondary servicing. Control functions of each torque lane and propeller can be consolidated, segregated, separated, and/or distributed to meet the stakeholder needs. Torque sources can be removed from powerplant powertrain to maintain degraded function of the powerplant from remaining torque source(s). Mode select allows optimization of the overall powerplant to meet the desired aircraft operation for a given mission or phase of flight.

As will be appreciated by those skilled in the art, aspects of the present embodiments may be embodied as a system, method or computer program product. Accordingly, aspects of the present embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce or control an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in a flowchart and/or block diagram block or blocks.

The methods and systems of the present disclosure, as described above and shown in the drawings, provide a control architecture for hybrid electric powerplants (HEPs) for aircraft. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
a thermal engine operatively connected to drive a propeller;
an electric motor operatively connected to the thermal engine to drive the propeller together with the thermal engine;
a external input system configured to accept input and output a thrust command;
a protection function module configured to independently enforce limits on the thermal engine, the electric motor, and the propeller; and
a low select module operatively connected to receive input from the external input system and input from the protection function module and to output the lower of the input from the protection function module and the input from external input system to the thermal engine, the electric motor, and the propeller.

2. The system as recited in claim 1, further comprising a transmission connecting the thermal engine and the electric motor in parallel to drive the propeller.

3. The system as recited in claim 1, wherein the propeller is a variable pitch propeller, wherein the low select module connects to the propeller through a propeller controller connected to control blade pitch of the propeller.

4. The system as recited in claim 1, wherein the low select module connects to the electric motor through a motor controller connected to control speed and/or torque of the electric motor by controlling electrical power supplied to the electric motor.

5. The system as recited in claim 1, wherein the low select module connects to the thermal engine through a thermal engine controller connected to control thrust and/or speed of the thermal engine by controlling fuel flow to the thermal engine.

6. The system as recited in claim 1, wherein the protection function module connects to the propeller through a feather module configured to feather blades of the propeller.

7. The system as recited in claim 6, wherein the feather module is connected to be controlled by the protection function module to trigger feathering of blades of the propeller in case of propeller or powerplant safety conditions such as overspeed.

8. The system as recited in claim 1, wherein the protection function module connects to the electric motor through a contactor to cut off power to the electric motor and/or through a mechanical disconnect.

9. The system as recited in claim 1, wherein the protection function module connects to the thermal engine through a fuel metering valve (FMV), a shutoff valve (SOV), and/or disconnect to cut off fuel flow to the thermal engine.

10. The system as recited in claim 1, wherein the external input system includes an avionics/FMS (flight mode select) input channel for receiving avionics/FMS input.

11. The system as recited in claim 1, wherein the external input system includes a pilot input channel for receiving pilot input.

12. The system as recited in claim 1, wherein the external input system includes a sensor input channel for receiving sensor input for feedback control of the thermal engine, the electric motor, and/or the propeller.

13. The system as recited in claim 1, wherein the external input system includes a mode select module configured to receive input from avionics/FMS (flight mode select), pilot input, and/or sensors, where the mode select module is configured to select a mode and output the mode to a thrust calculation module.

14. The system as recited in claim 13, wherein the thrust calculation module is configured to receive input from avionics/FMS, pilot input, and/or sensors, and to output steady state and transient thrust commands.

15. The system as recited in claim 14, wherein the thrust calculation module is configured to calculate a desired level of top level thrust based on mode selected, ambient conditions, and pilot input, and to calculate an acceleration/deceleration rate of command when a pilot moves a control lever and/or conditions change.

16. The system as recited in claim 14, further comprising a torque split and speed command module connected to receive steady state and transient thrust commands from the thrust calculation module and to output torque split and speed commands to the low select module.

17. The system as recited in claim 16, wherein the torque split and speed and command module is configured to split torque and speed commands between the electric motor and the thermal engine and to manage the propeller for thrust.

18. The system as recited in claim 13, wherein the mode select module is configured to select from at least some of the following modes:
 a maximum thrust mode configured to be used when maximum possible thrust is needed for a given command, ambient conditions, and/or operating conditions;
 a quiet mode configured to optimize a noise level of the system by adjusting operating level of the thermal engine as well as blade angle and/or speed of the propeller;
 a fuel efficiency mode configured to reduce as much as possible fuel consumption of the thermal engine by compensating with the electric motor;
 an energy efficiency mode configured to reduce as much as possible electrical energy consumption of the electric motor by compensating with the thermal engine; and/or
 a regeneration mode configured to run at specific thermal engine condition in order to recharge onboard batteries.

19. The system as recited in claim 1, wherein the protection function module is configured to calculate a torque command as limited by internal operating parameters including at least one of compressor inlet pressure/temperature, and remaining battery charge, and to monitor the electric motor, the thermal engine and the propeller for exceedance of key critical parameters including at least one of overthrust, overtorque, and overspeed, and to shut down an associated source among the electric motor, the thermal engine, and the propeller.

20. The system as recited in claim 1, wherein the low select module is configured to select a minimum torque/thrust command for the electric motor and the thermal engine.

\* \* \* \* \*